United States Patent [19]
Seifert et al.

[11] Patent Number: 5,591,336
[45] Date of Patent: Jan. 7, 1997

[54] APPARATUS FOR DEWATERING AND OR WASHING PAPERMAKING STOCK

[75] Inventors: Peter Seifert; David E. Chupka, both of Middletown, Ohio; Terry L. Bliss, Marietta, Ga.

[73] Assignee: The Black Clawson Company, Middletown, Ohio

[21] Appl. No.: 333,206

[22] Filed: Nov. 2, 1994

Related U.S. Application Data

[63] Continuation-in-part of Ser. No. 649,232, Jan. 29, 1991, Pat. No. 5,382,327, and a continuation of Ser. No. 649,231, Jan. 29, 1991, Pat. No. 5,384,231, which is a continuation of Ser. No. 278,105, Nov. 30, 1988, abandoned, said Ser. No. 649,232, is a continuation of Ser. No. 264,118, Oct. 28, 1988, abandoned.

[51] Int. Cl.⁶ ............................................. B01D 33/00
[52] U.S. Cl. ........................ 210/386; 162/317; 162/60; 162/56
[58] Field of Search ........................ 210/386, 401, 210/400, 416.1, 406, 388; 162/372, 357, 373, 342, 368, 317, 60, 56; 100/153, 118, 145, 155 R, 152

[56] References Cited

U.S. PATENT DOCUMENTS

| | | | |
|---|---|---|---|
| 847,352 | 3/1907 | Meincke | 162/337 |
| 1,241,905 | 10/1917 | Behr . | |
| 4,559,104 | 12/1985 | Eriksson | 162/336 |
| 4,722,793 | 2/1988 | Seifert et al. | 210/401 |
| 5,133,832 | 7/1992 | Gilkey | 162/4 |

FOREIGN PATENT DOCUMENTS 614901  2/1961  Canada .

*Primary Examiner*—Brenda A. Lamb
*Attorney, Agent, or Firm*—Biebel & French

[57] ABSTRACT

Improved apparatus for dewatering or washing a suspension of paper pulp in which first and second rolls are rotatably mounted with an endless loop of wire tensioned around the rolls, and in which a headbox delivers a pulp suspension to be thickened or washed and positioned with an outlet to discharge the pulp suspension into or onto the wire as it approaches the first roll, and in which the washed or dewatered pulp is collected after it has passed between the wire and a second roll, in which the first roll has a central shaft, and screw flighting on the shaft formed in left and right-hand sections are terminated at cylindrical discs mounted at opposite ends of the shaft, and in which the screw flighting has a depth which is substantially greater than the maximum thickness of the pulp layer and in which the aggregate open area between the screw flights is substantially greater than the cross-sectional area of the headbox outlet to assure that the spaces between the flights can be no more than partially filled with a pulp suspension during operation.

12 Claims, 5 Drawing Sheets

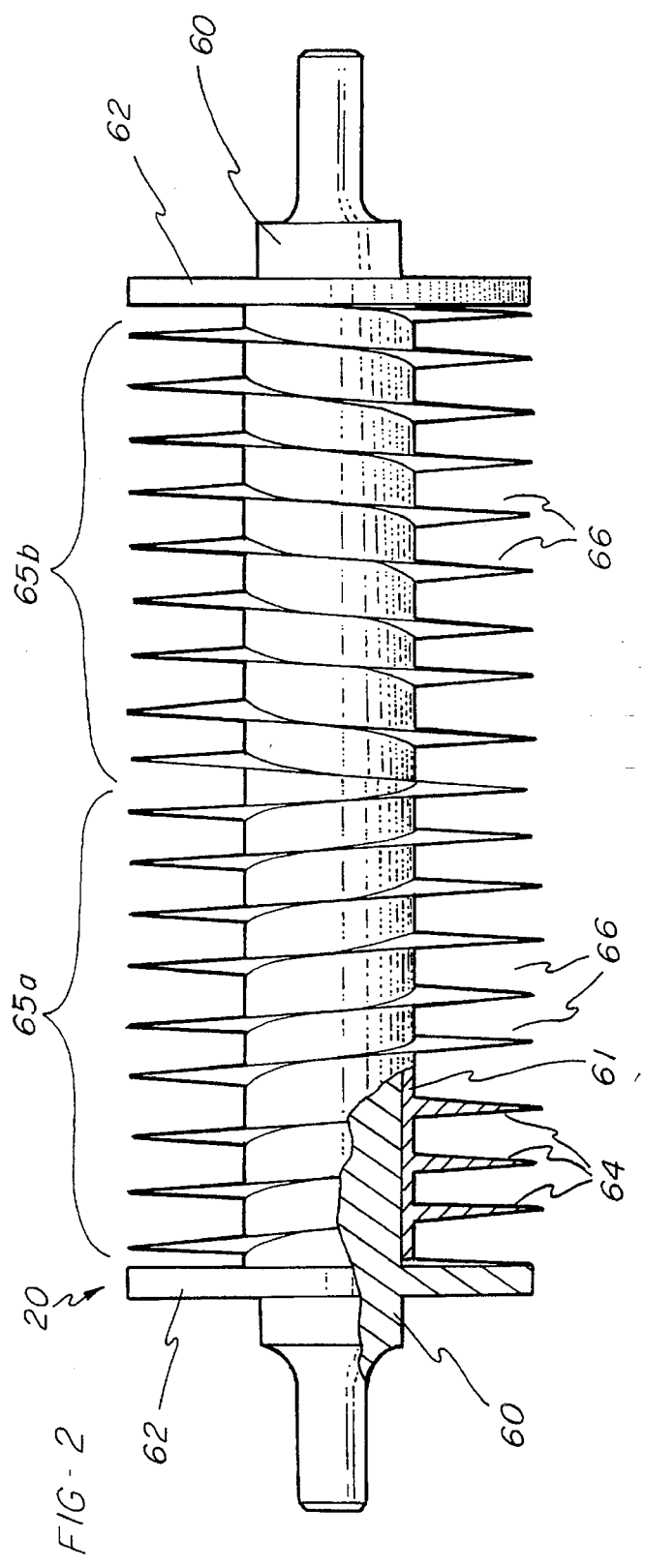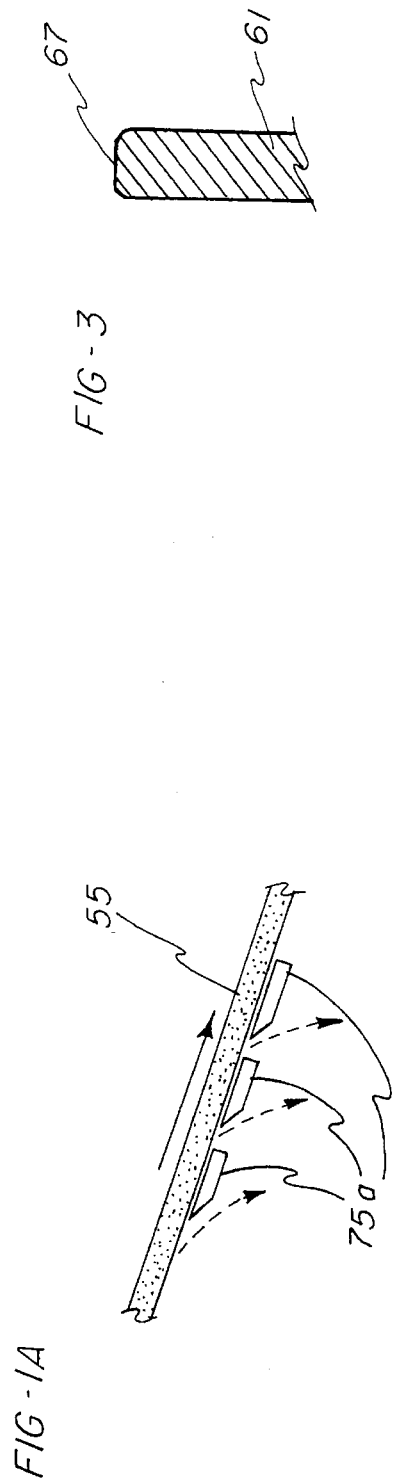

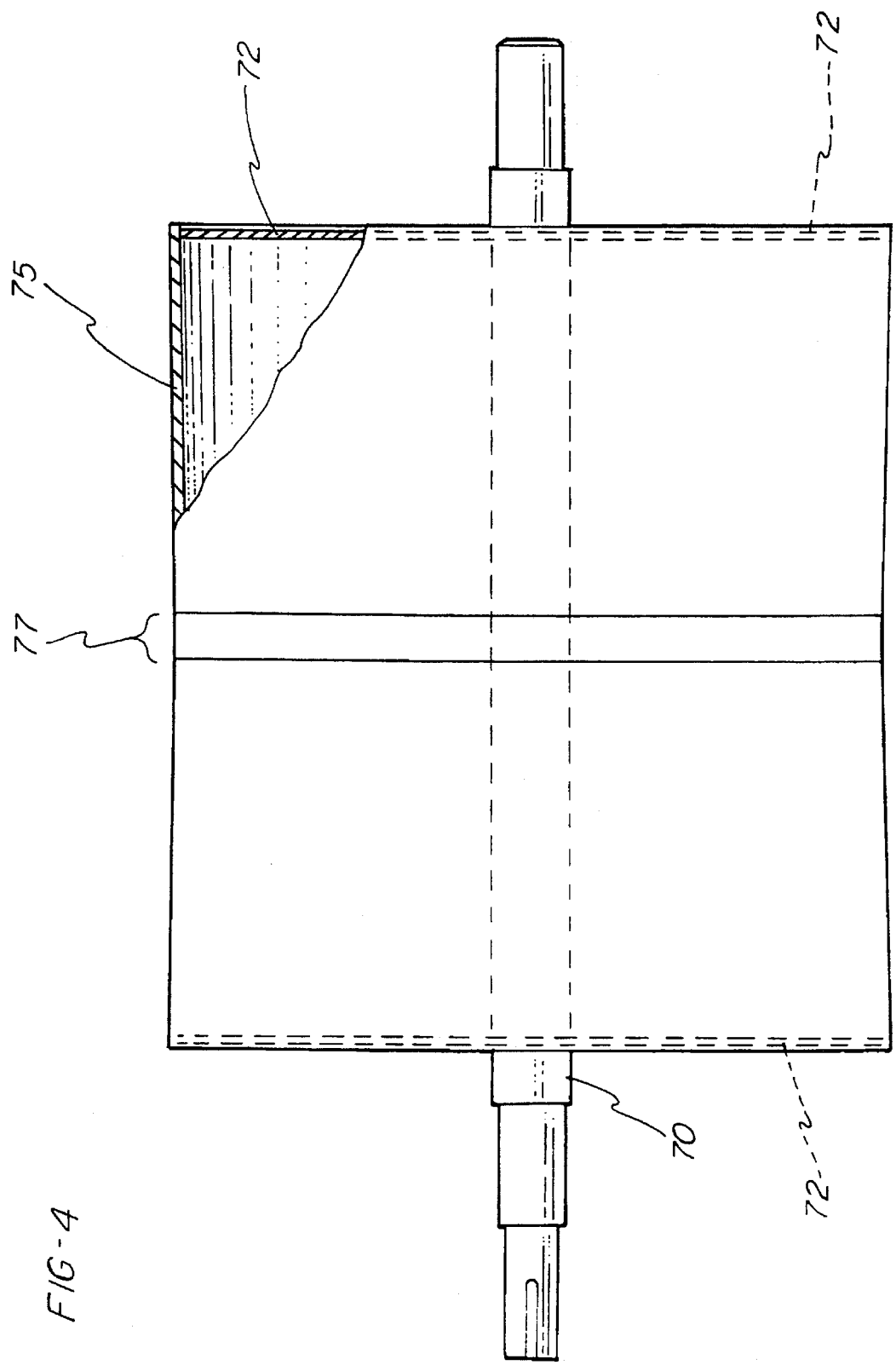

APPARATUS FOR DEWATERING AND OR WASHING PAPERMAKING STOCK

RELATED APPLICATIONS

This application is a continuation-in-part of co-owned applications Ser. No. 649,232, filed Jan. 29, 1991, now U.S. Pat. No. 5,312,327 as a continuation of Ser. No. 264,118, filed Oct. 28, 1988 (now abandoned), and which is a continuation of Ser. No. 649,231, filed Jan. 29, 1991 now U.S. Pat. No. 5,384,231 as a continuation of Ser. No. 278,105, filed Nov. 30, 1988 (now abandoned). To the extent that the disclosure of any of those applications is not repeated hereinafter, it is incorporated herein by reference.

BACKGROUND OF THE INVENTION

The subject matter of this invention is related to the apparatus for dewatering and/or washing pulp and paper stock as disclosed in Seifert et al. U.S. Pat. No. 4,722,793 (hereinafter the '793 patent) and in Gilkey, U.S. Pat. No. 5,133,832. The pulp may be derived primarily from waste paper. The major components of that apparatus are two rolls rotatably mounted in spaced relation on parallel axes. An endless mesh-type or porous or "wire" belt is trained around those rolls in wrapping relation with a substantial portion of their surfaces so that the rolls and belt cooperate to define an open space bounded by the rolls and the opposed upper and lower runs of the belt between the rolls.

A headbox is mounted within this space and includes an outlet which delivers the suspension to be dewatered or washed into the entry zone defined by the portion of the wire approaching one roll and the adjacent portion of the surface of that roll, so that this pulp suspension (sometimes referred to as "stock") is trapped on the inside surface of the wire. The rolls are driven at a sufficiently high speed to develop centrifugal force which causes liquid to be expressed through the wire from the stock layer between the wire and each roll, carrying along with it solid contaminates, including ash and ink particles, small enough to pass through the wire mesh. In addition to the centrifugal action, other dewatering mechanisms are also active. Means are provided for collecting the resulting washed and thickened pulp from the second roll and removing it to one side of the apparatus.

In the '793 patent, the roll adjacent the headbox, which will hereinafter be identified as the "breast" roll, is described as being either a smooth, impervious, solid roll, or a solid roll having indentations in its surface, and specifically with that surface comprising circumferentially arranged grooves separated by circumferential land portions, as also shown in patent '832.

The above identified application Ser. No. 649,232 discloses apparatus of the same general structural and operational characteristics as the apparatus of the '793 patent, but differing therefrom in that either or both of the breast roll and the other roll, hereinafter referred to as the "couch" roll, may be provided with an open surface such that the supply of pulp stock can flow into or out of the space within the roll before collecting on the surface of the wire as it passes around the roll. That application discloses a variety of forms of open faced roll, including one form wherein a support shaft has two or more circular disks mounted thereon in axially spaced relation forming the entire support for the wire on the roll.

Application Ser. No. 649,231 discloses a further development of the concept of the '793 patent wherein a third roll is mounted within the wire loop and is provided with its own headbox for supplying stock to be dewatered on top of the layer of pulp traveling to this third roll from the breast roll so that a second layer of dewatered pulp is formed on the wire for travel to and removal from the wire at the couch roll. That application discloses, inter alia, that the breast roll, and also the third roll, may be provided with helical grooves which spiral in opposite directions from the center of the roll.

SUMMARY OF THE INVENTION

The present invention provides dewatering apparatus generally similar to the apparatus disclosed in both the '793 patent and in application Ser. No. 649,232, and similarly comprising a breast roll and a couch roll rotatably mounted on substantially horizontal axis in spaced relation. An endless wire mesh belt is trained around these rolls in wrapping relation with a substantial portion of the surfaces thereof to define a space bounded by the rolls and the opposed upper and lower runs of the wire.

A headbox mounted in this space includes an outlet through which pulp suspension to be washed and/or dewatered is discharged into the entry zone defined by the breast roll and the portion of the wire approaching that roll. Provision is made for driving the rolls to cause the wire to travel around them at a speed effecting the development of sufficiently high centrifugal force to cause liquid to be expressed through the portion of the wire wrapping each roll, and thereby to dewater the resulting layers or strips of pulp carried on the inner surface of the wire. Provision is also made for removing the resulting partially dewatered pulp out of the space enclosed by the wire and breast roll.

A primary feature of the invention is that the breast roll is virtually entirely open faced in such manner that it is impossible in normal operation for pulp in the feed suspension to be subjected to mechanical pressure between the wire and any part of the roll. This result is accomplished by constructing the roll as a screw rather than in a form conventionally thought of as a roll. More specifically, the breast roll comprises a central shaft of relatively small diameter which serves as a mounting for screw flighting of substantially greater outer diameter than the shaft to provide correspondingly deep spiral grooves between the screw flights.

In a preferred embodiment of the invention, the outer edges of the screw flight defines segments of an imaginary cylindrical surface which segments supports the wire. The outer diameter of this spiral cylindrical surface is two or more times the diameter of the shaft on which the screw flights are mounted. This results in the condition that the space between adjacent flights is deeper than it is wide, and further are deeper in radial dimension than the width of the discharge outlet in the headbox, that it is physically impossible for this spiral-shaped space to be filled with stock, even in the zone which directly receives the discharge from the headbox.

The result of this combination is that the dilute stock initially discharged toward the inner surface of the wire loop fills only a portion of the space between the screw flights, and is therefore subjected only to centrifugal force as it travels on the wire around the breast roll. This action results in a high degree of dewatering through the wire without physical or mechanical compaction of the fibrous materials in the stock. Necessarily, the dewatering causes the formation of strips on the inner surface of the wire, which remain sufficiently loose for travel therethrough of the liquid component of the stock.

Even more important is that because the mat remains loose, solid contaminate particles, such as ink and ash or clay particles, when the apparatus is used for washing, are able to travel through the mat to and then through the wire more readily that when the mat is compressed between the wire and the outer surface of a solid cylinder. Also, because of the large capacity of the spaces between the screw flights, the volumetric rate per unit of axial length at which stock is discharged from the headbox can be much greater than in case of a dewatering apparatus wherein the feed stock is forced—in a small fraction of a second—into the very small space between a solid cylinder and a wire belt wrapping that solid cylindrical surface.

Because of the increase in volumetric capacity and throughput of the apparatus of this invention, and because the layer of fibers formed on the wire is thicker than has heretofore been practical or possible, a substantial reduction in the loss of "fines" in the white water effluent is achieved as compared to the operation of the commercial machine made according to patent '793, identified above and as further described in Gilkey '832. A "fine" in terms of papermaking stock or furnish, may be considered as any fiber which is sufficiently short so as to pass through the open mesh of the endless wire belt, usually of a size less than about 200 microns. In patent '832, a 200-mesh belt is described as having open spaces of 0.175 mm, so that fibers of 200 microns or longer are usually retained on the wire. The excess loss of fines as compared to the loss of undesirable solids, such as ink and ash, increases the recovery cost in the system, such as on the white water clarifier, or increases the overall economic loss by reason of the unrecovered fines. Where the fines are recirculated, separated by a clarifier and then and added to the inlet headbox, an excess amount of fines can overburden the recovery and feed-back loop.

The selective retention of short paper fibers, as compared to the washing out of ash, ink and other undesirable particles, may be explained by the relative thickness of the fiber layer which is selectively self-filtering once it has formed on the wire. Increases in the reduction of loss of solids has been measured at from 15% to 35%, a major portion of which is due to superior fines retention, which retention increases with increases in feed consistencies.

Because of this potentially great increase in the volumetric capacity for feed stock of the apparatus of the invention, if the apparatus is operated at its maximum feed capacity, it may require an open faced couch roll as disclosed in above application Ser. No. 649,232. In some respects, however, such a couch roll is not as desirable as a smooth couch roll because the thickened fiber mat must then be removed from the under surface of the top run of the wire to which it will naturally adhere, whereas with a smooth couch roll, it will transfer to that surface and be more readily removed therefrom than from the wire.

In the preferred practice of the invention, a smooth couch roll is used, but it is of a special construction enabling it to handle a greater volume of thickened pulp. More specifically, a preferred couch roll for the purposes of the invention is reversely crowned, i.e., with a slightly hour glass configuration, so that as the wire carrying a mat of dewatered pulp on its inner surface reaches and wraps around the couch roll, some of this pulp will be forced toward the center of the roll where it can be accommodated in the increased space or lower radial pressure from the wire as provided by the hour glass configuration of the roll. This design of couch roll can also be used with breast rolls of other configurations, such as the grooved breast roll of '793 patent and any of the open faced breast rolls of application Ser. No. 649,232.

Because of the distinctive advantages of the breast and couch rolls in combination as summarized above, it is possible and practical to combine a breast roll of the invention of relatively small diameter with a couch roll of substantially larger diameter, e.g., of the order of 2.5 times. With such an arrangement, the breast roll will operate at a correspondingly higher angular speed, thereby correspondingly increasing the centrifugal force which is the essential dewatering force effective on the feed stock as it travels on the wire around the breast roll. At the same time, the correspondingly slower angular speed of the larger couch roll will extend the interval during which the pulp which has been partially dewatered around the breast roll, so that the pulp will be compressed and further dewatered by wire tension pressure against the surface of the couch roll.

Other objects, features and advantages of the invention, and the means by which they are achieved and produced, will be apparent or be pointed out in the course of the detailed description of a preferred embodiment of the invention which follows.

BRIEF DESCRIPTION OF THE DRAWINGS

FIG. 1A is a fragmentary view of the lower run of the wire of FIG. 1 showing an alternative form of apparatus to enhance the dewatering of the pulp layer;

FIG. 2 is a detail view of the couch roll in FIG. 1, the view being taken on the line 2—2 in FIG. 1 with portions of the roll broken away and shown in section;

FIG. 3 is a fragmentary view on a larger scale of the outer edge of one of the screw flights in FIG. 2;

FIG. 4 is a sectional view on the line 4—4 in FIG. 1 illustrating details of the construction of the couch roll;

DETAILED DESCRIPTION OF THE PREFERRED EMBODIMENT

Figure 1:
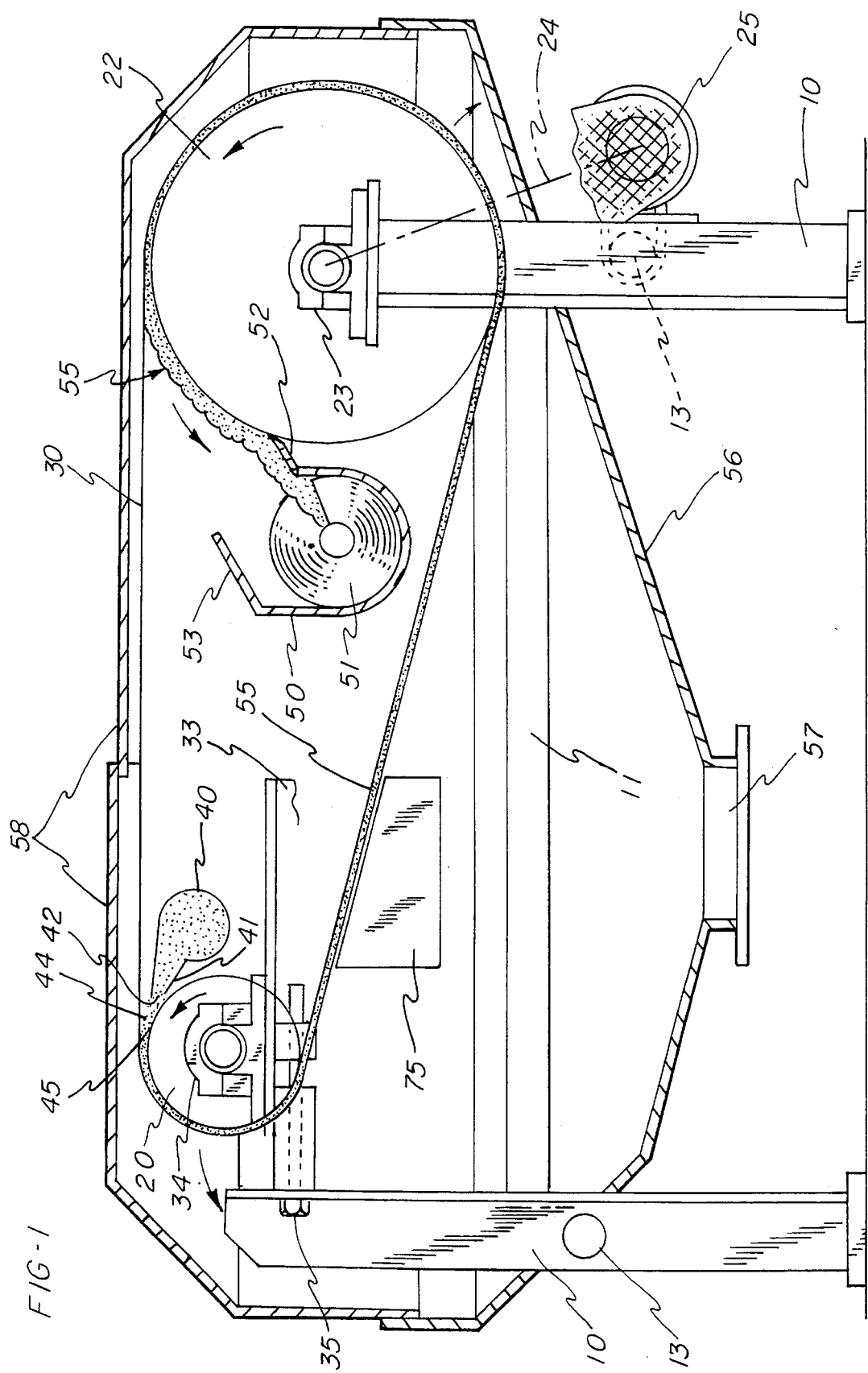
FIG. 1 is a relatively diagrammatic view in side elevation illustrating an embodiment of the invention.

FIG. 1 illustrates the basic structure of dewatering apparatus incorporating the present invention. It includes a frame comprising two columns 10 on each side connected by side beams 11 and suitable cross braces 13. First and second rolls, the breast roll 20 and couch roll 22, form respectively the major operating elements of this apparatus and are mounted adjacent opposite ends of the frame. The roll 22 is shown as mounted by pillow block bearings 23 on the tops of columns 10, and this roll is driven, through the belt drive indicated generally at 24, by a motor 25 mounted on a cross brace 13 between the columns 10 at that end of the apparatus.

An endless belt 30, which may be a woven foraminous plastic "wire", is trained around the rolls 20 and 22, and it defines therewith a space 33 in which other operating parts of the apparatus are located. The wire 30 may consist of any plastic material currently used for paper machine wires, e.g., polyester. Also, since the product of the machine is paper pulp, rather than a sheet on which wire marking may be undesirable, the wire 30 may be of the pin seam type wherein the ends of the wire belt include overlapping loops which are releasably fastened together by a metal or plastic "pin" inserted through these loops. Use of a pin seam wire is particularly desirable because it facilitates the changing of a belt without cantilevering the rolls as is required if the belt is endless, without a seam.

The breast roll 20 has an adjustable mounting on the frame which includes means for tensioning the belt or wire. Each of the journals of the roll 20 is mounted by a pillow block 34 on a base 33 which is in turn mounted for sliding movement on the adjacent side beam 11. Means such as a pair of jack screws 35 connected between bases 33 and the adjacent columns 10 cause and control this movement to effect corresponding control of the tension in wire 30. Since the couch roll 22 is of substantially greater diameter than the breast roll 20, its journals are mounted at a lower level in the frame such preferably that the upper run of the wire 30 is essentially horizontal.

A headbox 40 is mounted inside the space 33 on the same base members 33 as the roll 20 so that it maintains a fixed spacing with respect to roll 20. This headbox is shown as including upper and lower walls which converge to define a spout forming a slice on outlet slot 42 through which a relatively flat jet 44 of feed stock is discharged into the entry zone 45 defined by the roll 20 and the portion of wire 30 approaching that roll. The feed stock to be dewatered is fed to the headbox by any convenient feed line (not shown) from the usual stock supply pump or other process equipment (not shown).

At the other end of the space 33 from breast roll 20 is a trough 50 having a screw conveyor 51 mounted in the bottom thereof for receiving dewatered pulp from the surface of roll 22. A doctor 52 bridges the space between the bare surface of roll 22 and the upstream wall 3 of trough 50 to transfer the dewatered and thickened pulp from the surface of roll 22 to trough 50. The screw 1 forces this accumulated pulp to a chute (not shown) at the back of the machine which leads to the next station in the system. Details of the structure and mode of operation of the preferred form of doctor 52 are disclosed in U.S. Pat. No. 5,021,159.

With the breast roll 20 rotating at high surface speed, e.g., 2,000 to 6,000 or more feet per minute, the continuous application of centrifugal force causes a part of the liquid component of the feed stock to be expressed through the wire while the pulp materials suspended therein are held by the wire and form a still wet, strip-shaped layer or mat 55 on its inner surface. The liquid expressed through the wire, both in wrapping breast roll 20 and in subsequently wrapping the second roll 22, is collected in a trough 56 (FIG. 1) which extends under both of rolls 20 and 22 and is provided with a drain outlet 57. A hood 58 encloses the apparatus as a whole from above, and it fits into the top of the trough 56 so that any liquid hitting the inner surface of this hood will drip therefrom into the trough 55.

The novel structure of a preferred form of the breast roll 20 is illustrated in detail in FIGS. 2 and 3. It comprises a central shaft 60 of relatively small diameter in comparison with the size of other components of the apparatus, a satisfactory size being approximately 6 inches for a roll of the order of 3 feet in length. The shaft 60 itself may be made of stainless steel, and it is shown in FIG. 2 as also provided with cladding 61 of 14-gauge stainless steel. A circular disk 62, preferably of stainless steel, is mounted on each end of the cladding 61, and each of these disks is of sufficient thickness to form a support for the adjacent edge of the wire 30, e.g., a thickness of 1.25 inches.

Screw flight means 64 are mounted on the cladding 61 and extend thereon the full distance between the disks 62. For optimum results in the practice of the invention, the screw flight means 64 comprises two sets of screw flights 65a and 65b each of which extends from the middle of the roll 20 to one or the other of the disks 62, and which are of opposite hand so that they define helical spaces or grooves 66 that spiral in opposite directions from the center of the roll.

The outer edges of these screw flights form the sole mechanical support for the wire 30 between the disks 62, and they impart a lateral stretching action to the wire while avoiding repetitious and concentrated wire wear at any one position. Protection of the wire against wear is also promoted by rounding the edges of the screw flights about a radius, as illustrated at 67 in FIG. 3. For example, if each screw flight is ⁵⁄₁₆ inch thick, its edge 67 may be rounded about a radius of ³⁄₁₆ inch.

It is a dominant characteristic of the present invention that the spiral groove 66 between adjacent screw flightings provides, in radial section, an aggregate area which is so much larger than the cross sectional area of the headbox outlet slot 42 that it is impossible for either of these grooves to be completely filled with feed stock. As a specific example, with the headbox outlet slot 42 having a slot width or height of ⅜ inch, a satisfactory radial dimension for each of the screw flights 65a and 65b is of the order of 4 inches for a roll 20 having an overall diameter of about 14 inches, i.e., the radial dimension of the flights is at least twice the width of the headbox outlet slot 42 and is preferably greater than ten times the outlet width of the headbox.

The practical result of this dimensional relationship is that when the apparatus is operated under optimum conditions, even where this jet of feed stock is at its maximum thickness, in the vicinity of the twelve o'clock position on roll 20 in FIG. 1, it will fill only a minor portion of the total space available in the grooves 66. Centrifugal force will cause it to form a layer engaging the inner surface of the wire loop 30, and thus leave much of the radially inner space in the grooves 66 empty except for air.

Two major practical advantages result from these operating conditions. In the first place, the capacity of the apparatus, in terms of the flow rate of feed stock and the tonnage of fiber processed in a given time period, can be greatly increased in comparison, for example, with apparatus wherein the breast roll is a smooth cylinder as is disclosed in the embodiment of FIGS. 1 and 2 of the '793 patent.

With that prior construction, all of the feed stock which enters the entry zone 45 must be compressed in space, in the very short time interval required for it to travel through that zone, into the confined and pressurized space between the cylinder and the wire. In other words, by far the major amount of dewatering through the wire must take place in the wedge-shaped zone of that invention as the stock travels to the apex of zone 45, because wire tension limits the amount of thickened pulp which can be retained between the wire and a solid cylinder without being squeezed out past their edges.

A specific example will illustrate the importance of that factor, at a wire speed of 3,000 feet per minute which is a typical maximum speed for the apparatus of the above '793 patent. In that patent, the distance from the outlet slot 42 to the twelve o'clock position on a roll 20 which is 20 inches in diameter will then be no more than about 6 inches. If the discharge speed of the feed stock matches the wire speed, as is the conventional practice, the maximum time in which any particle of stock must travel through the entry zone 45 will then be 0.01 second, and during this interval, the stock will be compressed by the converging wire and roll surface to a thickness which will enable it to be forced between the wire and roll surface as it passes the twelve o'clock position.

In contrast, with the breast roll of the present invention, there are no corresponding physical, mechanical or temporal limitations on the amount of stock which can enter the grooves 66, and this gives rise to the second important advantage of the invention. More specifically, because the stock is not under a mechanical pressure, only centrifugal force is responsible both for effecting dewatering through the wire, and also for reducing the radial thickness of the progressively thickening layer of fiber forming along the inner surface of the wire loop.

This in turn means that because there is no mechanical force compressing the fiber against the wire, the fiber layers as a whole remain in a comparatively loose condition. This is especially important and advantageous when the apparatus is used in a system for deinking waste paper, because as centrifugal force causes more and more liquid to flow to and through the wire as it travels around the breast roll, this liquid can carry many more contaminant particles through the loosely packed fiber mat than when this mat is so mechanically compressed between a wire and a smooth solid cylinder that it will act as a filter which retains contaminant particles, unless the flow rate of the feed stock is controlled to limit the basis weight of the mat to a range wherein the mat is not so thick as to cause a filtering effect.

The invention takes advantage of this feature by providing two additional features which further enhance and increase its advantages. In the first place, because dewatering at the breast roll is effected only by centrifugal force, the breast roll of the invention is made of a substantially smaller diameter than the breast roll in apparatus in accordance with the '793 patent, and the couch roll is made with a diameter 1.5 or more times that of the breast roll.

More specifically, where the '793 patent discloses 20 inches as a typical diameter, and the apparatus manufactured under that patent by the assignee of this application commonly provides breast rolls of 32 inches in diameter, the breast roll 20 of the present invention is preferably of much smaller diameter, for example between about 14 and 15 inches. Since the circumferential dimension of this roll is preferably less than about one-half that of the couch roll, its angular speed will be about twice as great, or more. It will therefore develop more than twice the centrifugal force as compared to that of a 32-inch breast roll.

Further as to the construction of the breast roll 20 in FIGS. 2-3, in a typical example, the shaft 60 with the cladding 61 thereon may have a diameter of 6.125 inches, and each of the disks 62 may have an outer diameter of 14.62 inches. The radial dimension of the individual screw flights 65 will then be 4.25 inches, which will also be the radial depth of the grooves 66. Other typical dimensions are a spacing of 2 inches between the tips of adjacent screw flights, and a thickness of ⅜ inch for each screw flight at its base adjacent the cladding 61.

It is apparent from these dimensions that the aggregate area of the grooves 66 in an axial section through the breast roll will be many times the cross-sectional area of the headbox outlet slot 42. This dimensional relationship makes it certain that when the discharge speed of the feed stock is of the same order or magnitude as the wire speed, as is the preferred operating condition, it will be impossible for stock to fill more than a minor portion of the grooves 66. Further, centrifugal force will cause this stock to form relatively thin layers 55 against the exposed inner surface of the wire loop 30, and will continue to cause dewatering of these layers as they travel on roll 20 toward the six o'clock position on the roll and leave the roll 20 to travel to roll 22.

As a practical example of operating conditions of the apparatus with the breast roll 20 of FIG. 2, a typical consistency of the feed stock is 1%, while the consistency of the fiber layer 55 leaving the breast roll will be 4% to 5%. If it is 4%, this means that the total liquid content of the layer has been reduced by approximately 75%, and the thickness of the mat has been correspondingly reduced to about one-eighth of an inch.

Further dewatering of the layer 55 can be effected by the use of a suction box 75 over which the wire travels on its way to the couch roll 22 as shown in FIG. 1. Alternatively, dewatering foils 75a may be used at the outer surface of the lower run of the wire to effect further dewatering of the layer 53 as shown in FIG. 1A.

Because the construction of the breast roll of the invention makes it possible to increase materially the volumetric flow of feed suspension thereto, there will be a corresponding increase in the basis weight of the pulp layer 55, and it is important that all of this layer of thickened pulp be retained between the wire and the couch roll 22 until it is removed from that roll. And it is also desirable to effect the maximum possible dewatering of this pulp as it travels around the couch roll. The second additional feature of the invention as noted above is provided by constructing the couch roll 22 with what may be termed a reversely crowned surface, i.e., a generally hour glass configuration.

As shown in FIG. 4, the couch roll 22 comprises a central shaft 70, a cylindrical disk 72 adjacent each end of this shaft, and a tubular shell 75 enclosing and welded to the disks 72. The outer surface of this shell 75 is reversely crowned so that at its center, its diameter is approximately 0.25 inch less than at its outer ends. Preferably this shell will include a cylindrical portion 77 at its center, while its surface will taper outwardly from each side of this cylindrical portion to the end of a shell 75 which has a total length of approximately 38 inches that matches the length of the face of breast roll 20.

As noted above, in the preferred practice of the invention, the couch roll 22 will be substantially larger in diameter than the breast roll 20, and in the specific example described above, the overall diameter of the couch roll will be 34 inches, namely more than twice the maximum diameter of the breast roll. This dimensional relationship, in addition to the reverse crowning of the couch roll, improves the operating results of the apparatus of the invention in two respects. In the first place, the reverse crowning minimizes the possibility that any of the thickened pulp reaching the couch roll from the breast roll will be squeezed out at the sides of the machine, and it will instead be urged toward the center of the couch roll by the wire tension pressure as it travels around the couch roll.

In the second place, since the circumference of the couch roll is more than twice that of the breast roll, and with the wire meeting the couch roll in advance of the six o'clock position thereon, the dwell time of each incremental amount of pulp between the wire and the couch roll will be more than twice the time of its travel around the breast roll. During this increased time interval, the layer or mat of thickened pulp received from the breast roll will be subjected to wire tension pressure against the impervious surface of the couch roll, and as the wire compresses the fiber against the roll, additional liquid will be forced through the wire. It is important to note as to this portion of the operation of the apparatus that although the wire pressure will compress the fiber mat as it travels around the couch roll, this will not significantly reduce the washing action when the apparatus is used in the deinking system. This is because the mat reached the couch roll without having been mechanically compressed, and it will therefore not significantly obstruct the passage therethrough of contaminate particles with the liquid extruded through the wire, at least during a substantial portion of the total interval of travel of each increment of the fiber mat around the couch roll 22.

As a practical matter, it is the capacity of a solid surfaced couch roll to handle the pulp 55 received from the breast roll without having it squeeze out at the sides of the wire which limits the capacity of the apparatus as a whole to less than that of the screw flighted breast roll 20 in its own right. That total capacity can be increased by replacing the reversely crowned couch roll 22 with an open faced couch roll of the characteristics disclosed in the above application Ser. No. 649,232, possibly at the expense of somewhat increased water content of the final discharge pulp.

Figure 5:
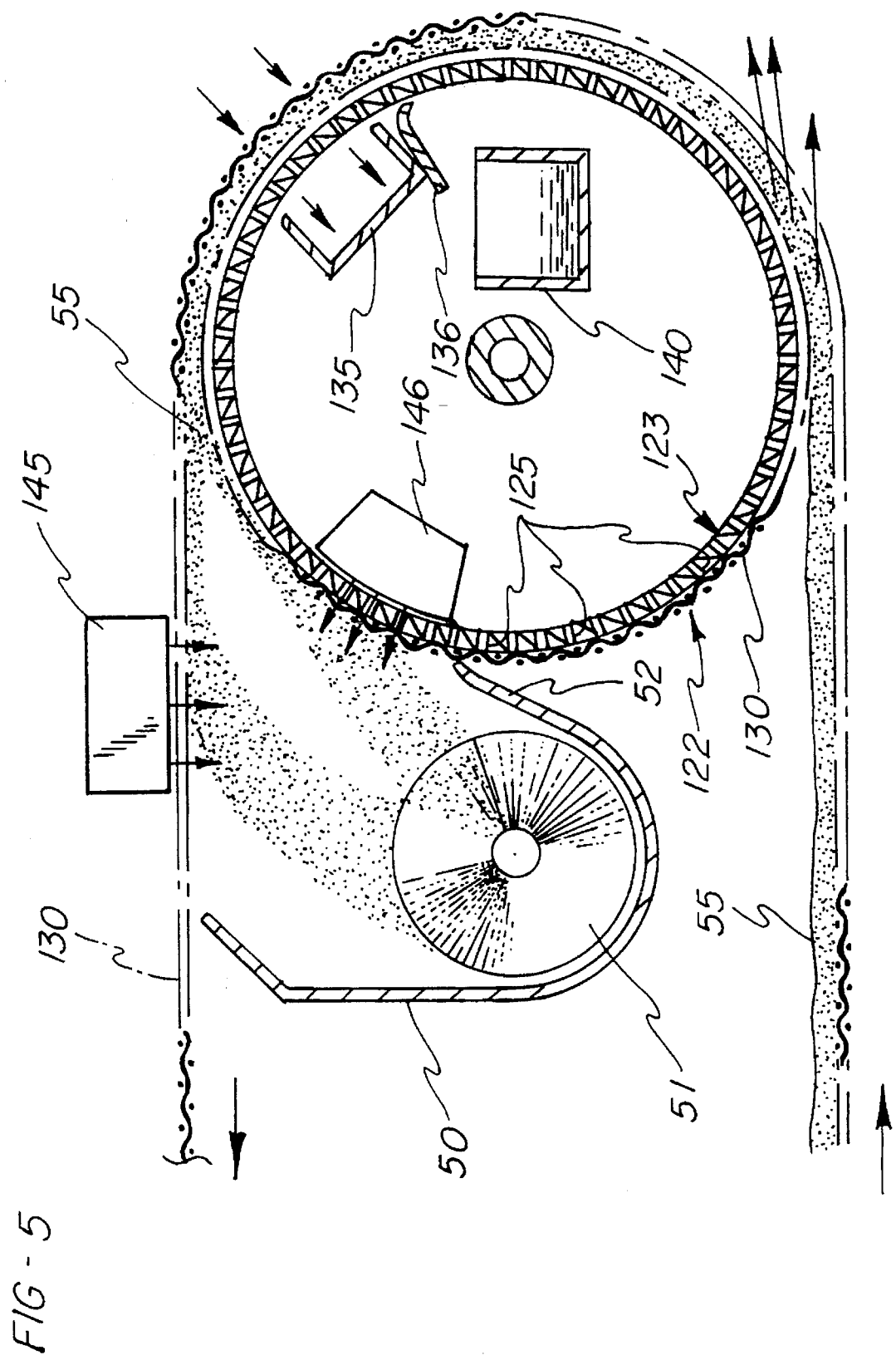
FIG. 5 is a fragmentary view similar to FIG. 1 illustrating an embodiment of the invention incorporating an open faced couch roll.

Thus referring to FIG. 5, the couch roll 122 includes a hollow shell 123 having multiple drilled holes 125 therethrough, and which may be covered by a wire mesh 130. For maximum water removal without solid particles larger than common contaminant particles, and without the wire mesh cover 130, using the squeezing pressure or force of the wire in tension, the openings 125 in shell 123 should be correspondingly of sufficiently small size to pass liquid therethrough but not the paper fibers of the pulp.

In the embodiment shown in FIG. 5, it is of course important to remove the free water and contaminant particles which migrate inwardly to the interior of the shell, and to prevent rewetting of the pulp when it leaves the pressure zone. For this purpose, an internal doctor in the form of a suction box 135 is arranged on the inner surface of the shell 123, preferably at a location therein more than half way around the squeeze zone but before the exit zone where the wire separates from the roll. A wiper or doctor blade 136 at the upstream or leading side of the box 135 removes the film of water from the inside surface of the shell 123, and directs it into a removal trough 140. The water discharge from trough 140 may conveniently be routed through the hollow roll shaft 141, which also provides convenient means for venting the interior of roll shell 123 to atmosphere.

FIG. 5 also illustrates the preferred arrangement for the removal of whatever portion of the fiber layer may follow either the outer surface of the roll shell 123 or the inside surface of the wire belt, in the form of air pressure doctors or blow boxes. A blow box 145 positioned above the wire near the point where the wire departs from the roll 122 will force pulp material entrained within the wire into the conveyor trough 50. If required, a second blow box 146 may be positioned on the inside surface of the shell 123 just above the doctor 55 to direct pulp material from the exterior of the roll into the trough 50 and screw 51.

The system shown in FIG. 5 is usable in more than one form, depending on the desired results. If it includes all of the components shown in FIG. 5, it will have higher capacity than when the apparatus includes the solid surfaced couch roll of FIG. 4, and it will achieve approximately the same extent of dewatering as the couch roll of FIG. 4, depending upon the extent to which it prevents water received in the interior of the roll shell from returning to the outside of the shell through holes 125.

It is also possible and practical to use the roll 122 in a simpler version wherein no provision is made for recovering water from its interior, but with that interior vented to atmosphere. In such use, compression of the fiber layer 55 by wire tension pressure will cause some water to enter the interior of the roll temporarily, rather than causing laterally outward squeezing of the pulp as can happen with a solid couch roll as described above. Although that water will return to the fibers, under centrifugal force, further around the couch roll, the end result will be an increase in the total capacity of the apparatus than with a solid couch roll but the end product will be of a lower consistency.

It is possible that in the use of the embodiment just described, the dewatered pulp product will be of somewhat lower consistency than when using a solid surfaced couch roll, due to rewetting from the interior of the roll. Such rewetting, however, can be offset by increased dewatering caused by centrifugal force, which is more effective with an open faced couch roll having a vented interior providing air to the inner surface of the fiber mat to replace liquid urged through the mat by centrifugal force. The advantages of this feature also increase as the wire speed is increased to increase the effective centrifugal force around the couch roll, and correspondingly to increase the centrifugal discharge of liquid from the mat.

The substantial increase and throughput of apparatus in accordance with this invention, as compared to that of apparatus made in accordance with the teachings of patents '793 and '832 have, at the same time, resulted in a 15% to 35% increase in retained solids in the white water or effluent collected at outlet 57. This decrease in the overall loss of solids in the white water is diagrammed in FIG. 6 in which wire speeds of from 2,000 feet to 4,000 feet per minute are plotted on the horizontal axis, and the percent of losses of total solids in the white water is plotted on the vertical axis. The waste paper stock used for the rests represented by the curves was derived primarily from mixed office waste paper. The curves on the graph of FIG. 6 show the results running at three stock inlet feed consistencies, namely 1%, 2% and 3% for apparatus constructed according to prior patent '793, and apparatus constructed according to the embodiment of FIGS. 1–4 of this invention.

Figure 6:
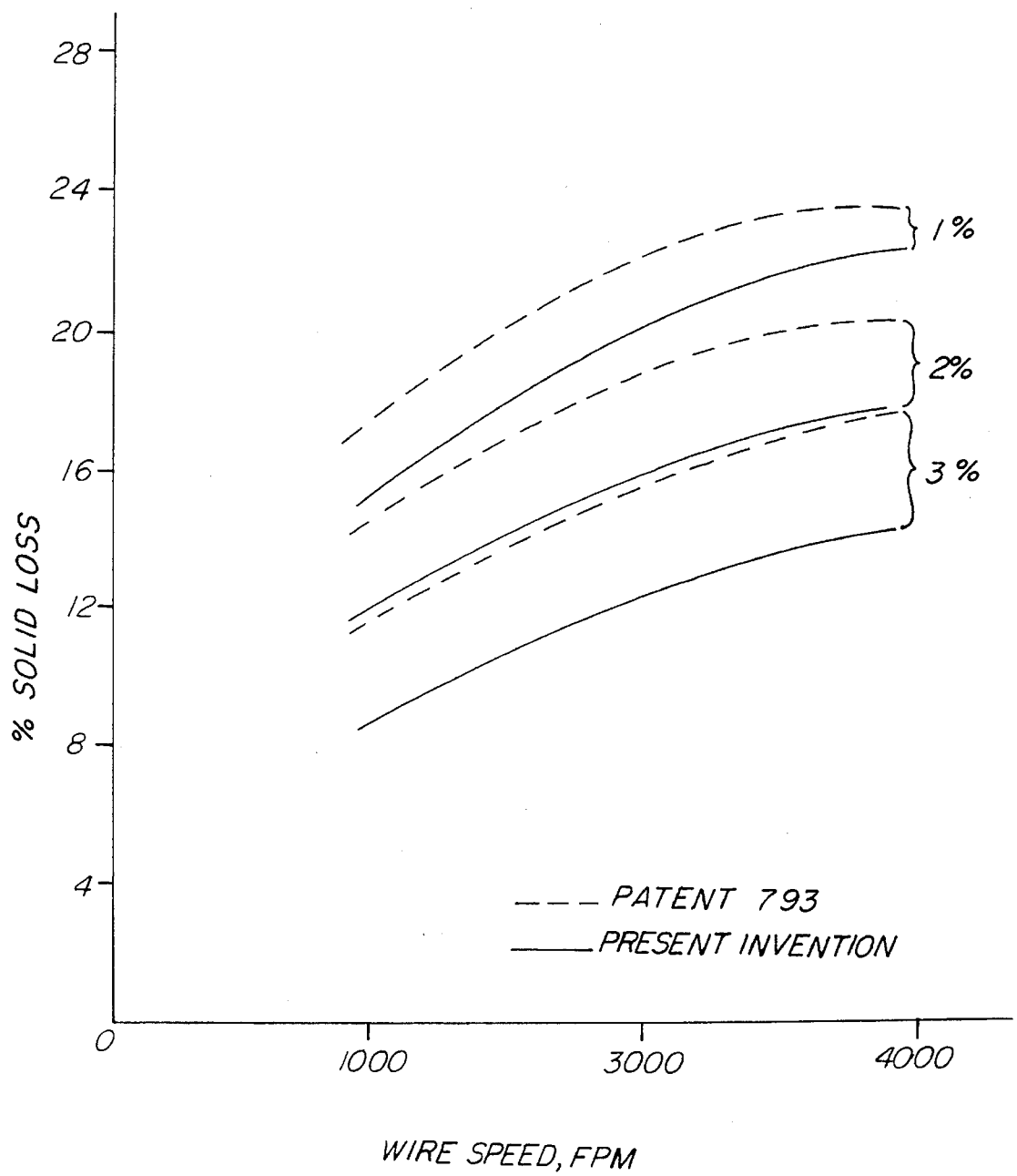
FIG. 6 is a graph showing the percentage increase of retained solids when operating a machine according to FIGS. 1–4 of this invention as compared to operating apparatus according to the prior art, illustrating the percent of retained solids from a slurry of waste paper stock at 1%, 2% and 3% consistencies.

In reference to FIG. 6, it will be seen when this apparatus is used a measurable decrease in loss of solids occurs when the inlet consistency is 1%. This decrease is in the order of about 15%. However, when a much higher inlet consistency, of 3% is used, the increase in retention of solids is much higher, in the order of 35% or more. Examination of the retained solids indicate that a higher percentage of fines have been retained as compared to ink and ash, and this retention is believed due to the selective self-filtering action of the correspondingly thicker layer of fibers on the wire at 3% inlet consistency, which fibers hold back the fines but do not correspondingly hold back undesirable contaminants such as carbon particles and ash.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. In an apparatus for dewatering or washing a suspension of paper pulp in water, including a frame, first and second rolls rotatably mounted in spaced relation in said frame, an endless loop of wire tensioned around said rolls in wrapping relation with a substantial portion of the circumference thereof and cooperating therewith to define a space bounded by said rolls and opposed connecting runs of said wire, a headbox mounted on said frame in said space and including an outlet slot for the pulp suspension to be thickened, said headbox being so positioned that said outlet slot discharges the pulp suspension onto said wire approaching or wrapping said first roll, means for driving at least one of said rolls to cause said wire to travel around said rolls at a speed effecting the development of centrifugal force, and causing liquid to be expressed through the portion of said wire wrapping each of said rolls and thereby to cause partially dewatered pulp to collect on the inner surface of said wire, and a pulp collector mounted on said frame in said space between said wire runs in position to collect said partially dewatered pulp, the improvement comprising:

said first roll having a central shaft, screw flight means mounted on said central shaft and extending across the width of said wire run, said screw flight means defining a discontinuous cylindrical surface supporting said wire, and the radial dimension of said screw flight means being at least twice the width of said headbox outlet slot.

2. The apparatus as defined in claim 1 wherein said shaft has a pair of cylindrical disks mounted thereon adjacent the opposite ends thereof in spaced relation substantially equal to the width of said wire, said screw flight means includes two screw flight sets, each of which extends from the center of said first roll to one or the other of said disks respectively, and said screw flight sets each having turns of spiral flighting being of opposite hand whereby the spaces between adjacent said turns of flighting form helical grooves which spiral in opposite directions from the center of said first roll.

3. The apparatus as defined in claim 1 wherein the radial dimension of said screw flight means is at least ten times the width of said headbox outlet.

4. The apparatus as defined in claim 1 wherein the diameter of said second roll is at least twice that of said first roll.

5. The apparatus as defined in claim 1 wherein said second roll includes an imperforate shell which is generally cylindrical.

6. The apparatus as defined in claim 5 wherein said second roll shell is reversely crowned with a portion of minimum diameter at the center thereof and portions of maximum diameter at opposite ends thereof.

7. The apparatus as defined in claim 1 in which the diameter of said second roll is greater than the diameter of said first roll by a factor of at least about 1.5.

8. The apparatus as defined in claim 1 wherein said second roll comprises a cylindrical shell having perforations therein for inward passage therethrough of liquid from said mat.

9. The apparatus as defined in claim 8 further comprising water removing and collecting apparatus within said shell for collecting and removing liquid received through perforations in said shell.

10. The apparatus as defined in claim 8 further comprising a wire mesh covering on said shell of a mesh size which will retain paper fibers in the suspension.

11. The apparatus as defined in claim 10 further comprising water removing and collecting apparatus within said shell for collecting and removing liquid received through said perforations in said shell.

12. In apparatus for dewatering or washing a paper pulp in a suspension of pulp and water in which first and second rolls are rotatably mounted in spaced relation to each other on a frame, and an endless loop of wire is tensioned around said rolls and defining a space bounded by said rolls and the opposed interconnecting runs of said wire, a headbox having a outlet positioned to direct pulp suspension to be treated by said apparatus into an entry zone defined by said first roll and a portion of a run of the wire approaching and wrapping said first roll, including a motor for driving at least one of the rolls to cause said wire to travel therearound, at a speed effecting the development of centrifugal force and causing liquid to be expressed through the portion of the wire wrapping each of the rolls, thereby to cause a partially dewatered pulp layer to collect on the inner surface of the wire, and including means in the space between the wire runs, positioned to collect partially dewatered pulp from the second roll, the improvement comprising:

said first roll having a central shaft, said central shaft having a pair of cylindrical discs mounted thereon adjacent the opposite ends thereof in spaced relation substantially equal to the width of said wire, screw flighting mounted on said central shaft and extending across the width of said wire between said discs and being formed with radially outer surfaces of a diameter substantially the same as said discs for supporting said wire thereon, and the radial dimension of said screw flighting being substantially greater than the slot height of said headbox outlet whereby the aggregate open area between said screw flighting in axial section is substantially greater than the cross-sectional area of said headbox outlet to assure that at no time in the operation of said apparatus will the spaces between said screw flighting be more than partially filled with said pulp suspension.

* * * * *